J. L. WOODBRIDGE.
CAR AXLE LIGHTING SYSTEM.
APPLICATION FILED JAN. 10, 1908.

1,067,630.

Patented July 15, 1913.

2 SHEETS—SHEET 1.

WITNESSES:

INVENTOR.
Joseph L. Woodbridge.
BY
ATTORNEY.

UNITED STATES PATENT OFFICE.

JOSEPH LESTER WOODBRIDGE, OF PHILADELPHIA, PENNSYLVANIA.

CAR-AXLE-LIGHTING SYSTEM.

1,067,630. Specification of Letters Patent. Patented July 15, 1913.

Application filed January 10, 1908. Serial No. 410,259.

*To all whom it may concern:*

Be it known that I, JOSEPH L. WOODBRIDGE, a citizen of the United States, and resident of Philadelphia, in the county of Philadelphia and State of Pennsylvania, have invented certain new and useful Improvements in Car-Axle-Lighting Systems, of which the following is a specification.

My invention relates to systems in which a generator driven at variable speed is used for supplying current to a constant potential circuit, as in the case of a generator for train lighting driven from the axle of the moving car, or a generator driven by a windmill at variable speed.

The principal object of my invention is to provide simple and reliable means for maintaining a constant potential at the generator terminals with widely varying speed changes.

Other objects as well as the general nature and scope of my invention will be more clearly seen from the following description taken in connection with the accompanying drawings, in which—

Figure 1:
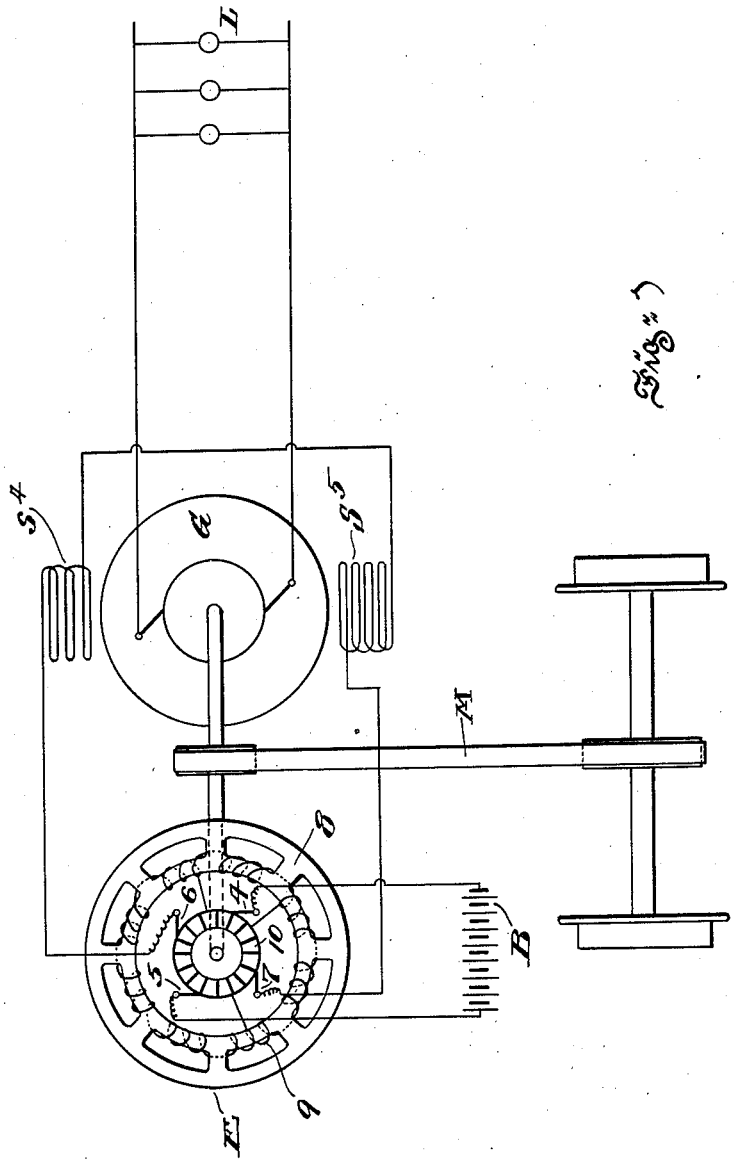
Figure 2:
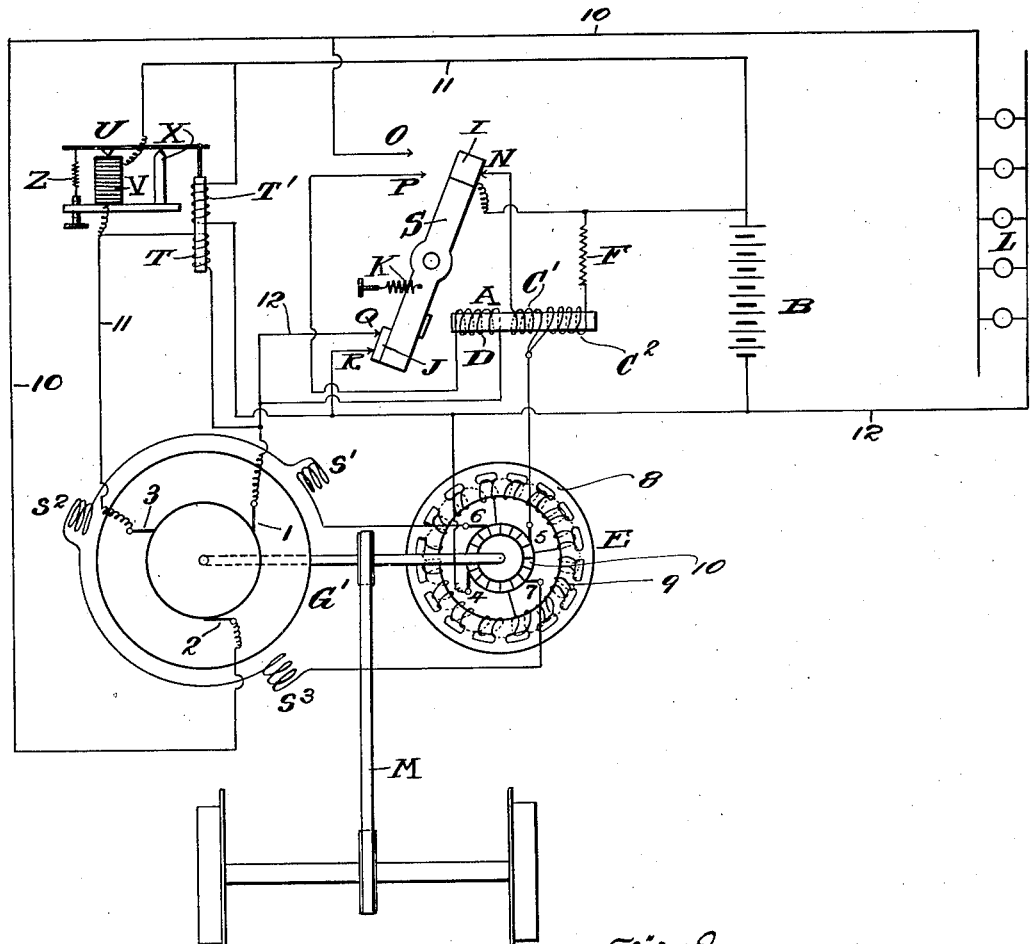

Figure 1, represents an axle lighting system in a simplified form embodying features of the invention, and Fig. 2, is a modification of this system.

In Fig. 1, G, is a direct current generator supplying current to the translating devices L and driven at a variable speed by means of a belt M running on a pulley mounted on the car axle. On the same shaft as the generator armature, is mounted an exciter E. This exciter consists of a frame or core of magnetic material 8, on which is a winding 9, connected to a commutator 10, in the usual manner, only a few of the connections being shown on the drawings for the sake of clearness. To avoid confusion, only a few of the connections from the winding to the commutator are shown. Two pair of brushes 4—5 and 6—7 bear upon this commutator at points displaced at an angle of 90°. One pair of brushes 4—5 is connected to a source of constant potential, here shown as a storage battery B. The other pair 6—7, is connected to the field windings $S^4$ and $S^5$, of the generator G.

The operation of this apparatus is then as follows: Assume first that the generator G and the exciter E, are driven at a certain fixed speed; the battery will tend to send current through the armature winding 9 between the brushes 4—5. This current would become excessive were it not for the counter electro-motive-force developed in this armature by reason of its rotation in the field produced by the current output from the brushes 6—7 as explained below. Assume a small amount of current flowing in the armature winding 9 between the brushes 4—5. This current will produce a field whose axis will be in line with the brushes 4—5. This field will produce an electro-motive force across the brushes 6—7 and this electro-motive-force will send current through the field windings $S^4$ and $S^5$ of the generator G. The effect of this latter current, however, on the exciter E will be to produce a second field whose axis will be in line with the brushes 6—7, and this second field will produce a counter electro-motive-force between the brushes 4—5 sufficient to prevent any further increase of current from the battery. It will be seen that for any given speed the flow of current from the brushes 6—7 through the field windings $S^4$ and $S^5$ will depend upon the voltage of the battery B, and will be sufficient to produce the field necessary to develop the counter electro-motive-force required to nearly balance that of the battery. If, however, the speed should increase, a weaker field, and therefore a smaller amount of current from the brushes 6—7 will be required to produce the same counter electro-motive-force. It will be seen, therefore, that as the speed of the generator and exciter varies, the current in the field windings $S^4$ and $S^5$ will vary in the opposite direction, thus maintaining constant voltage on the generator G, regardless of changes of speed. It will also be noted that if the direction of rotation reverses, the current in the field windings $S^4$ and $S^5$ will also reverse, so that the generator will maintain the same polarity.

The system as shown in Fig. 1, is open to two objections. First, if the speed becomes very low, the amount of current flowing from the battery into the exciter and the amount of current flowing from the exciter through the field windings $S^4$ and $S^5$ will both become abnormally great. Second, the battery B, is always discharging and means must therefore be provided for charging this battery when not in service. In the system shown in Fig. 2, these two objections are eliminated, and certain other modifications are introduced. The generator $G^1$, is shown as a three pole machine provided with three brushes 1, 2, and 3, arranged to develop two different potentials. Brush 2, is connected to conductor 10, which is connected to one side of the lamp circuit L, while brush 3, is connected to conductor 11, which is connected to the positive terminal of the battery B and is maintained at a higher potential than that of the lamps. Conductor 12, is a common return for both circuits and is connected by contacts on the switch S with brush 1. The exciter E operates as described in connection with Fig. 1, the brushes 4—5 being connected across the battery terminals, while the brushes 6—7, supply current to the field windings $S^1$, $S^2$ and $S^3$. An automatic switch S, is shown, designed to disconnect the exciter from the battery automatically when the flow of current from the battery to the exciter is abnormally great and at the same time to disconnect the battery from the generator $G^1$ and connect it directly to the lamp circuit. This switch S, is operated by an electromagnet A opposing an adjustable spring K.
In the position shown, the pull of the spring K, preponderates and brush 1 of the generator is connected to the negative terminal of the battery and to the lamp circuit by means of the contact points Q and R, which make contact with a conducting plate J, on the switch S. Brush 4, of the exciter E is permanently connected to conductor 12, which is connected to the negative terminal of the battery, while brush 5, of the exciter E, is connected to the positive terminal of the battery by means of contact N, which makes contact with the conducting plate I, on the switch S, the plate I, being connected to the positive battery terminal as shown. In the circuit between the contact N and the brush 5, is a coil $C^1$, wound on the electromagnet A. A second coil $C^2$, is also wound on the electro-magnet in the same direction as the coil $C^1$, having its terminals connected to the circuit on opposite sides of the contact N, so that when this contact is broken, current will flow through the coil $C^2$. A resistance F, is shown in series with the coil $C^2$, which may be used to adjust its effect. The coils $C^1$, and $C^2$, are so designed that when the current flowing from the battery through the exciter by way of the brushes 4—5 exceeds a certain predetermined amount, the force of the spring K, will be overcome by the pull of the electromagnet A and the switch S will be thrown over, the coil $C^2$, being then sufficient to hold it in the new position. This will break the contacts at the points Q and R, disconnecting the generator from the battery, and will also break the contact at N, disconnecting the battery from the exciter, except for the small amount of current which will flow through the coil $C^2$, this being a coil of many turns of fine wire.

In the second position of the switch S, the contact plate I, makes contact with the points O and P. By means of the contact with the point O, the battery terminal is connected directly to the lamp circuit, and by means of the contact P, a third coil D, on the electro-magnet A, is connected at one terminal through the contact plate I and point O, with the brush 2, of the generator $G^1$, while the other terminal of the coil D, is permanently connected to brush 1, of the generator $G^1$. This coil is wound differentially with respect to the coils $C^1$ and $C^2$, and is so designed that when the voltage of the generator $G^1$, increases to a certain point the coil D, will sufficiently neutralize the effect of the coil $C^2$ to permit the spring K to preponderate and pull the switch back to its original position. The voltage between the brushes 1 and 2 of the generator $G^1$ necessary to excite the coil D in this way will be produced by the small current flowing through the exciter by way of the resistance F and the coil $C^2$ and the resultant current flowing from the brushes 6—7 through the field windings $S^1$, $S^2$ and $S^3$, the result being that when the generator $G^1$ has reached a certain predetermined speed, the switch S will be thrown into the position shown in Fig. 2, automatically.

When the apparatus is connected as shown in Fig. 2, it will be seen that the battery B is charging and at the same time maintaining the voltage across the brushes 4—5 of the exciter E. Without some controlling apparatus this arrangement would be unstable since an increase in the battery voltage would cause a corresponding increase in the generator voltage and there would be nothing to prevent a wide variation of generator voltage, since the voltage of battery and generator would go up and down together. In order to maintain a constant battery voltage regardless of changes in the generator voltage the regulator U is shown interposed in the circuit between the brush 3, of the generator and the battery. This regulator consists of a pile of carbon disks V, which are connected in series with the conductor 11. These disks are subjected to pressure by means of a lever pivoted at X. The pressure is produced by an adjustable spring Z, whose tension is opposed by a solenoid at the opposite end of the lever excited by two coils T and $T^1$. The coil $T^1$, is connected across the terminals of the battery, while the coil T is connected between the brushes 1 and 3, of the generator. These two coils are wound in the same direction and coöperate to relieve the pressure on the carbon pile V. As is well known, the resistance of the carbon pile will increase when the pressure is released. If, therefore, the voltage of the battery should slightly increase the pull produced by the coil $T^1$ will relieve the pressure on the carbon pile, thus increasing its resistance and reducing the amount of current flowing from the generator into the battery. This reduction in current will tend to prevent further increase in the battery voltage. If the voltage of the generator rises the effect of the coil T will be increased, again relieving the pressure on the carbon pile V and increasing the resistance in the circuit between the generator and the battery. The rise in generator voltage will therefore produce no appreciable increase in the charging current, and the battery voltage will not increase.

What I claim is:

1. A dynamo and its exciter mechanically connected, two sets of electrically displaced brushes for the exciter, whereof one set is connected to a source of constant potential while the other is connected to the field windings of the dynamo.

2. A dynamo, a variable speed driving source for said dynamo, an exciter, means for driving the exciter at a speed proportional to that of the dynamo, two sets of electrically displaced brushes for the exciter, whereof one set is connected to a source of constant potential while the other is connected to the field windings of the dynamo.

3. In combination a dynamo having appropriate field windings, a consumption circuit, a commutator, two sets of brushes bearing upon said commutator, a circuit including the field windings of the dynamo connecting the opposite brushes of one set, another circuit including a storage battery connecting the opposite brushes of the other set, means including a magnetic circuit and coils thereon connected to the commutator for producing between the opposite brushes of each set an electro-motive-force controlled by the current in the circuit connecting the other set, means for producing relative rotation of brushes and commutator proportional to the speed of the dynamo, and means for interposing resistance between the battery and the brushes and connecting the battery to the consumption circuit when the speed of the generator falls below a certain limit.

4. In combination a dynamo having appropriate field windings, a consumption circuit, a commutator, two sets of brushes bearing upon said commutator, a circuit including the field windings of the dynamo connecting the opposite brushes of one set, another circuit including a storage battery connecting the opposite brushes of the other set, means including a magnetic circuit and coils thereon connected to the commutator for producing between the opposite brushes of each set an electro-motive-force controlled by the current in the circuit connecting the other set, means for producing relative rotation of brushes and commutator proportional to the speed of the dynamo, connections for charging the battery from the dynamo including a variable resistance, an electro-responsive device for controlling said resistance, and means for disconnecting the battery from the generator and connecting it to the consumption circuit when the speed of the generator falls below a certain point.

5. In combination a consumption circuit, a storage battery, generating apparatus having appropriate field windings and adapted to develop two different electro-motive-forces whereof one is suitable for the consumption circuit and the other for charging the battery, appropriate connections from the generating apparatus to the consumption circuit and the battery, a variable speed source of power for driving the generating apparatus, and means responsive to changes in the speed of the driving source and controlled by the voltage at the battery terminals for varying the current in the field windings.

6. In combination a consumption circuit, a storage battery, generating apparatus having appropriate field windings and adapted to develop two different electro-motive-forces, whereof one is suitable for the consumption circuit and the other for charging the battery, appropriate connections from the generating apparatus to the consumption circuit and the battery, a variable speed source of power for driving the generating apparatus, means responsive to changes in the speed of the driving source and controlled by the voltage at the battery terminals for varying the current in the field windings and means responsive to changes of battery voltage for controlling the battery charging current.

7. In combination a consumption circuit, a storage battery, generating apparatus having appropriate field windings and adapted to develop two different electro-motive-forces, whereof one is suitable for the consumption circuit and the other for charging the battery, appropriate connections from the generating apparatus to the consumption circuit and the battery, a variable speed source of power for driving the generating apparatus, means responsive to changes in the speed of the driving source and controlled by the voltage at the battery terminals for varying the current in the field windings, and means responsive to changes of voltage of the battery and the generating apparatus for controlling the battery charging current.

8. In combination a consumption circuit, a storage battery, generating apparatus having appropriate field windings and adapted to develop two different electro-motive-forces, whereof one is suitable for the consumption circuit and the other for charging the battery, appropriate connections from the generating apparatus to the consumption circuit and the battery, a variable speed source of power for driving the generating apparatus, means responsive to changes in the speed of the driving source and controlled by the voltage at the battery terminals for varying the current in the field windings, and means responsive to changes of voltage of the generating apparatus for controlling the battery charging current.

9. In an electrical system a variable speed dynamo having appropriate field windings, a storage battery, means responsive to changes in the dynamo speed and controlled by the voltage at the battery terminals for varying the current in the field windings and connections for charging the battery from the dynamo, in combination with means responsive to changes in the voltage of the dynamo for controlling the charging current to maintain the battery voltage substantially constant.

10. In combination a variable speed dynamo having appropriate field windings, an exciter for said dynamo comprising an armature and its commutator and two pair of relatively displaced brushes bearing on said commutator, a circuit including a storage battery connecting the brushes of one pair, connections from the other pair to the field windings of the dynamo, means for driving the exciter at speeds proportional to and varying with the dynamo speed, and connections from the dynamo for charging the battery including a regulator adapted to control the charging current to maintain substantially constant voltage at the battery terminals.

In testimony whereof I have hereunto signed my name.

JOSEPH LESTER WOODBRIDGE.

In the presence of—
  WM. J. JACKSON,
  FRANK E. FRENCH.